Oct. 6, 1953

D. P. BRUBAKER ET AL
ORDINALLY-SELECTIVE KEY-RESPONSIVE
CYCLE INITIATING MECHANISM 2,654,539

Filed Aug. 30, 1948

Inventors
Damon P. Brubaker
and
Fred E. Woodley
By Joseph Harris Attorney

Oct. 6, 1953

D. P. BRUBAKER ET AL
ORDINALLY-SELECTIVE KEY-RESPONSIVE
CYCLE INITIATING MECHANISM 2,654,539

Filed Aug. 30, 1948

Inventors
Damon P. Brubaker
and
Fred E. Woodley
Joseph Harris Attorney

Oct. 6, 1953

D. P. BRUBAKER ET AL
ORDINALLY-SELECTIVE KEY-RESPONSIVE
CYCLE INITIATING MECHANISM 2,654,539

Filed Aug. 30, 1948

Inventors
Damon P. Brubaker
and
Fred E. Woodley
Joseph Harris Attorney

Oct. 6, 1953

D. P. BRUBAKER ET AL
ORDINALLY-SELECTIVE KEY-RESPONSIVE
CYCLE INITIATING MECHANISM

2,654,539

Filed Aug. 30, 1948

Inventors
Damon P. Brubaker
and
Fred E. Woodley
By Joseph Harris Attorney

D. P. BRUBAKER ET AL
ORDINALLY-SELECTIVE KEY-RESPONSIVE
CYCLE INITIATING MECHANISM 2,654,539

Filed Aug. 30, 1948

INVENTORS
DAMON P. BRUBAKER &
FRED E. WOODLEY

BY *Earl Benst*
*Justin S. Lowiston*

THEIR ATTORNEYS

Oct. 6, 1953

D. P. BRUBAKER ET AL  
ORDINALLY-SELECTIVE KEY-RESPONSIVE  
CYCLE INITIATING MECHANISM 2,654,539

Filed Aug. 30, 1948

INVENTORS
DAMON P. BRUBAKER &
FRED E. WOODLEY

BY *Earl Beust*
*Justin S. Compton*

THEIR ATTORNEYS

Patented Oct. 6, 1953

2,654,539

UNITED STATES PATENT OFFICE 2,654,539

ORDINALLY-SELECTIVE KEY-RESPONSIVE CYCLE INITIATING MECHANISM

Damon P. Brubaker and Fred E. Woodley, San Bernardino, Calif., assignors to The National Cash Register Company, Baltimore, Md., a corporation of Maryland Application August 30, 1948, Serial No. 46,814

7 Claims. (Cl. 235—62)

This invention relates to calculating machines and, more especially but not exculsively, to calculating machines of the motor or power operated, key-set type.

The invention is provided for use in connection with a full-keyboard listing machine, by which is meant a machine having denominational rows of digit keys for setting up the value of items to be entered and printed. In machines of this type, it is the common practice for the operator to set up the value of an item to be entered, followed by operation of what is known as a "motor bar," which initiates an entry cycle of operation of the machine, during which the amount set up on the keyboard is entered into the machine and in which the digits of the entered amount are printed in a horizontal line on record material.

By this invention, the necessity for the operator to use the "motor bar" is eliminated in most entries. Means is provided whereby the machine is pre-set for an intended series of entry operations, so that the operation of any of the digit keys of the lowest denominational order involved as a significant digit in the series will initiate an entry cycle of the machine. Although means is provided for pre-setting the machine to so activate any selected denominational row of keys, by coupling a movable initiating device to the selected row, the preferred form of the invention provides means to equip one or more denominational rows with machine-cycle-initiating devices and means for activating a selected one for use.

If, for instance, the transactions to be dealt with in a series of entries to be made into the machine involve decimal currency including pennies as the lowest significant digits, the units bank digit keys would be selected for activation, and the operator would enter items in the usual fashion either by operating the units order key simultaneously with higher order digit keys or by operating the keys serially starting with the highest order key involved. As the units order key is operated, the machine entry cycle is commenced, and the amount is entered into the machine and printed. As most of such full-keyboard machines have no zero-representing keys, the "motor bar" must be operated when no key is operated in the units bank, but this will be necessary for only that small fraction of the entries ending in zero. If the series of items to be entered do not involve pennies or dimes, but even-dollar amounts, the hundreds denominational order key bank is activated and the units order bank deactivated, if desired. The invention is adaptable to denominational systems other than the decimal system, such as the sterling currency system, or to counting systems of weights and measures such as those commonly used in calculating machines.

Means is provided, also, for arranging a convenient control for such machines to select whether the entry operation is to be additive or subtractive. Normally, such machines are constructed to enter items additively, and means is provided by this invention to overcome this condition, for one entry or a series of entries, so the items will be entered subtractively.

It will become apparent from the specification to follow that the holding down of a key in a denominational row that is activated will result in repeated entry into the machine and the printing of the corresponding value, and, further, if other digit keys are held down therewith during such repeated entries, their values will likewise be entered into the machine and printed on the record material.

An object of the invention is to provide, in a power or motor operated calculating machine of the full-keyboard type, means for reducing the number of manual operations required of the operator in either adding or subtracting operations of the machine to thereby reduce the amount of time and effort necessary to perform a given calculating problem.

Another object of the invention is to provide means of the character indicated in the preceding paragraph which are exceedingly simple, inexpensive and applicable to calculating machines of various types now in general use without requiring any changes in the standard arrangement of the usual actuating, accumulating, transfer, registering, and printing mechanisms thereof.

A further object of the invention is to provide means of the character indicated in the two preceding paragraphs which may be applied in the nature of an accessory or attachment at relatively nominal expense, to various types of calculating machines already in use.

Still another object of the invention is to provide, in key-set types of motor or power operated calculating machines, means optionally inoperative or selectively operable for initiating an operating cycle of the machine upon actuation of a numeral key in a selected one or another of the denominational banks or rows of keys and thus, under the latter condition, eliminating in most instances the necessity of operating the usual motor bar to make entries.

A specific object of the invention is to provide, in a calculating machine, means for initiating an operating cycle of the machine upon operation of any numeral key of a predetermined or selected bank of keys, said key operation moving an element common to all of the keys of the selected bank of keys to activate the initiating means.

A further specific object of the invention is to provide means of the character set forth in the immediately preceding paragraph which, in the case of key-set machines, may be selectively adapted to be associated with or disassociated from any one of a plurality of the banks of keys of the machine.

Still another object of the invention is to provide simple and inexpensive means whereby, in case one or a series of amounts are to be subtracted, a subtract bar may be so set that an operating cycle of the calculating machine will be initiated upon actuation of any numeral key in a predetermined bank of keys to enter the selected amount subtractively.

Other objects of the invention will appear from the following description taken in connection with the drawings.

The power or motor operated calculating machine chosen to illustrate incorporation of the present invention is the well known Allen-Wales calculator, only such parts thereof being shown in the drawings as are deemed necessary for an understanding of the invention since the details of various features of the actuating, transfer, accumulating, registering and printing mechanisms are well known and are shown and described in United States patents to Peters 1,386,021; White 1,854,875; and Lambert 2,422,103 and 2,428,084, to which reference may be had.

Figures 18, 19:
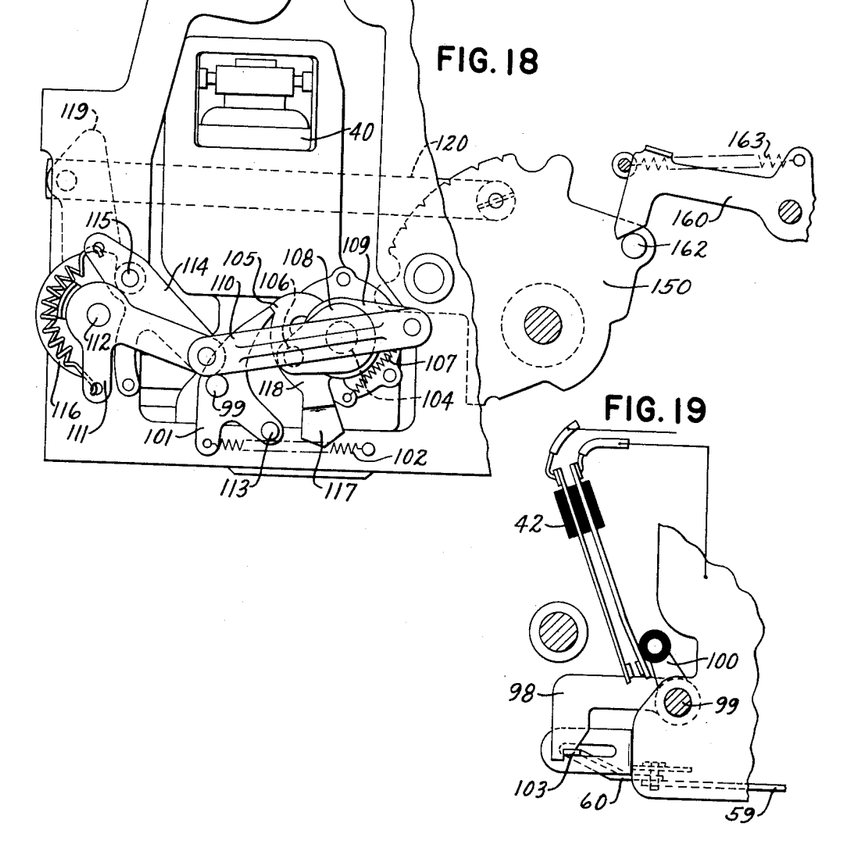
Fig. 18 is an elevation of the motor, clutch and single-cycle main drive mechanism as seen from the rear of the left side of the machine.
Fig. 19 is a detail of the motor contact switch and tripping mechanism.

Referring to Fig. 18, the machine has, as its source of operating power, an electric motor 40 the circuit of which is closed by the counter-clockwise movement of lever 100 (Fig. 19) secured on shaft 99 to which is secured bell crank lever 98 and the three-armed single cycle control lever 101 (Fig. 18). Spring 102 urges shaft 99 counter-clockwise but the shaft is prevented from so rocking when the end 103 of lever 60 is under a shoulder of lever 98 as seen in Fig. 19. Forward movement of link 59 (Fig. 3) rocks lever 60 clockwise releasing lever 98 (Fig. 19) causing the closing of the normally open contacts of motor switch 42 which starts the motor and through a reduction gear box turns shaft 104 counter-clockwise. The counter-clockwise turning of cycle control lever 101 cause its upwardly and forwardly extending arm to move from engagement with a shoulder on clutch pawl 105 which rocks counter-clockwise on stud 106 secured on crank arm 108, loosely mounted on shaft 104, under the influence of spring 107. This connects pawl 105 to a notched wheel secured to shaft 104 and crank arm 108 turns with shaft 104. Secured to crank arm 108 is a second crank arm 109, loosely mounted on shaft 104 and pivoted to its outer end is a drive link 110 which in turn is pivoted to crank 111 loosely mounted on the rear drive shaft 112 of the machine. Crank 111 is rocked clockwise and then counter-clockwise, as seen in Fig. 18, whenever shaft 104 rotates once from normal home position. As shaft 104 nears completion of any rotation the tail 117 of plate 118 secured to crank arm 108 strikes stud 113 of lever 110 rocking it clockwise to effective position where it will disengage the pawl 105 if it remains in effective position due to the latching of end 103 of lever 60 under the shoulder of lever 98. Such will normally occur in a single cycle machine operation under the influence of spring 63 to be described, but such may be overcome by holding lever 60 against the restoring action of spring 63. Crank 111 is coupled to shaft 112 through the medium of lever 114 pivoted to the forwardly extending arm of crank 111 where link 110 is pivoted, which lever carries a roller stud 115 held by a spring in a notch of plate 116 secured to shaft 112. As crank 111 is rocked so is shaft 112 except when an overload is placed on the mechanism, under which circumstances roller 115 slips from its notch, resulting in an idle movement. This single cycle drive mechanism, as has been indicated, may be controlled for multiple cycle operations by preventing return of lever 60 to normal position where it latches arm 98 as shown in Fig. 19. Drive shaft 112 extends across the rear of the machine and has secured on its right end drive lever 119 to which is pivoted drive link 120 which at its forward end is pivoted to drive plate 150 (see also Fig. 15) secured to the differtial drive shaft 151 which, therefore, is rocked, as seen in Fig. 15, first counter-clockwise and then clockwise during a machine cycle.

As indicated more or less conventionally in Fig. 1 of the drawings, the calculating machine is provided with a case 20; an eight decimal denominational order set of numeral, or digit, keys 21—21 labeled 1 to 9 as customary; registering wheels 22; printing mechanism 23; add motor bar 24; subtract motor bar 25, modified as hereinafter described; and the usual repeat, clear, non-print, space, non-add, sub-total and total bars or levers as indicated thereon.

Figures 16, 17:
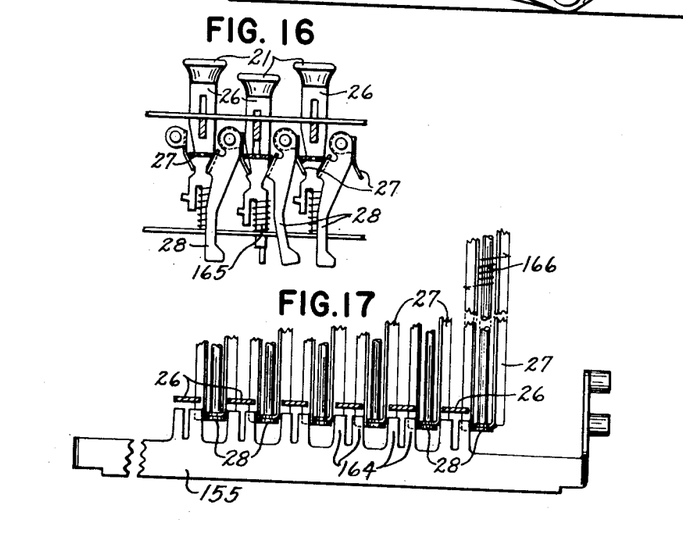
Fig. 16 is a detail section across the end of three rows of keys in front of the zero stop plates.
Fig. 17 is a detail top plan of a portion of the front ends of several rows of latch plate, zero stop plate and key release mechanism.

Referring to Figs. 4, 5, 14, 16 and 17, especially Figs. 16 and 17, each of the depressible digit keys is provided with a depending stem 26, those key stems of a denominational bank cooperating with an associated differential stop bar 168 (see Fig. 14) which will be later described, for controlling the entry of amount data during machine operations. As is usual, each key is provided with a return spring 165 (Fig. 16). The keys of each denominational row have a common latching plate or shutter 27 spring-pressed by a spring 166, to be later described, against the left edges of the associated keys. The left edges of the keys are formed so that as a key is depressed the latch plate is rocked to one side and on full depression of the key the latch plate rocks back into a locking formation on the key to hold it in depressed condition, as is the case with the depressed middle key in Fig. 16. Near the close of a machine operation the latch plates of all denominational orders are rocked to ineffective condition allowing depressed keys to be returned to normal position under the influence of their return springs. Running from front to rear between each two key rows and on the outside of the key rows of lowest and highest orders are support rods which are mounted in the keyboard frame and on which the latch plates are rockably mounted. Sharing the same support rods, a zero stop plate or shutter 28 is provided for each denominational key row and each is rockingly urged against the right sides of its associated keys by its spring 166, each key having a cam contour which rocks the lower edge of the associated plate 28 to the right when depressed as seen in Fig. 16. The forward end of each zero stop plate is provided with a depending leg which hangs straight down, when no key in its associated row is depressed, as is the case with the two outside keys in Fig. 16, blocking the forward movement of the associated stop bar 168 (see Fig. 14). When a key is depressed, as is the middle key in Fig. 16, the depending leg of the associated zero stop plate is rocked to one side so the associated stop bar will be able to move during an ensuing machine operation, under control of the associated depressed key 21. The zero stop plates or shutters, if moved by a key, will be restored to normal position by springs 166 (Fig. 17) as the associated digit keys are restored to raised condition at the end of a machine operation. The machine cycle initiating mechanism of this invention utilizes the movement of one or more of these zero stop plates to activate the electric circuits to be described.

Figure 14:
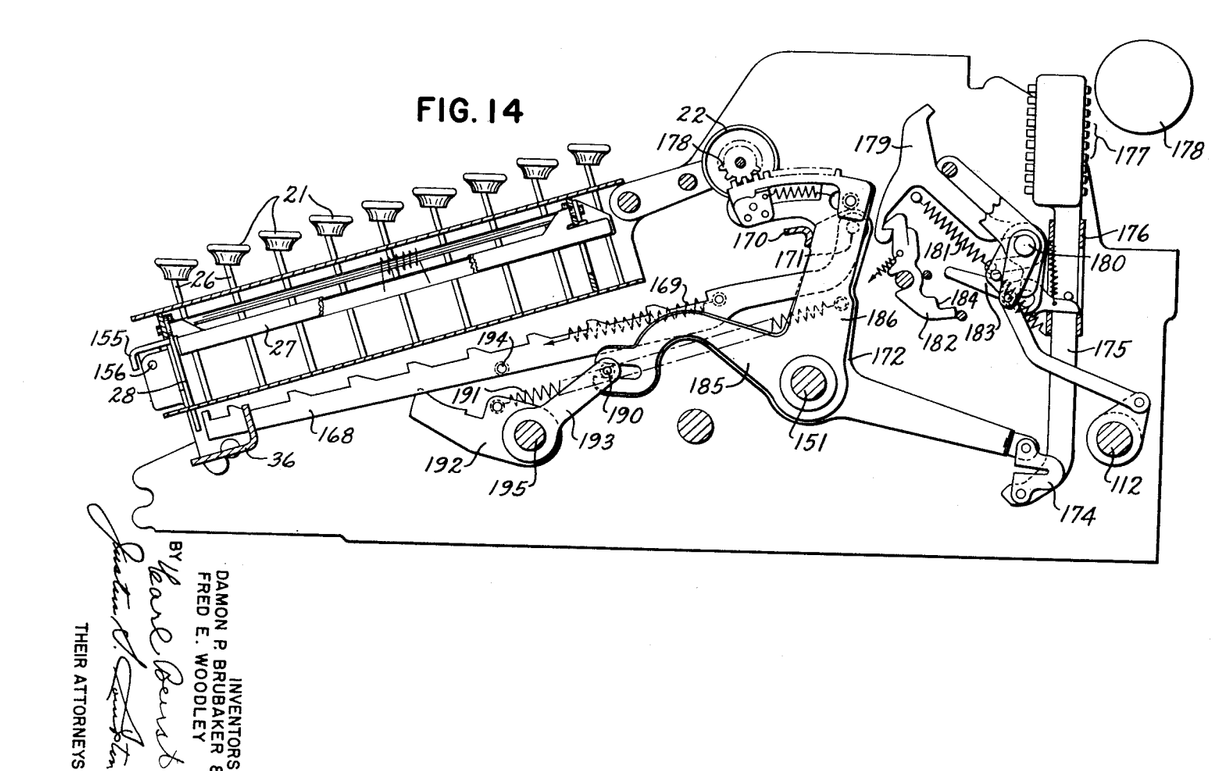
Fig. 14 is a typical vertical section from front to rear through the keybank, differential and printing mechanisms of the machine.
Figure 15:
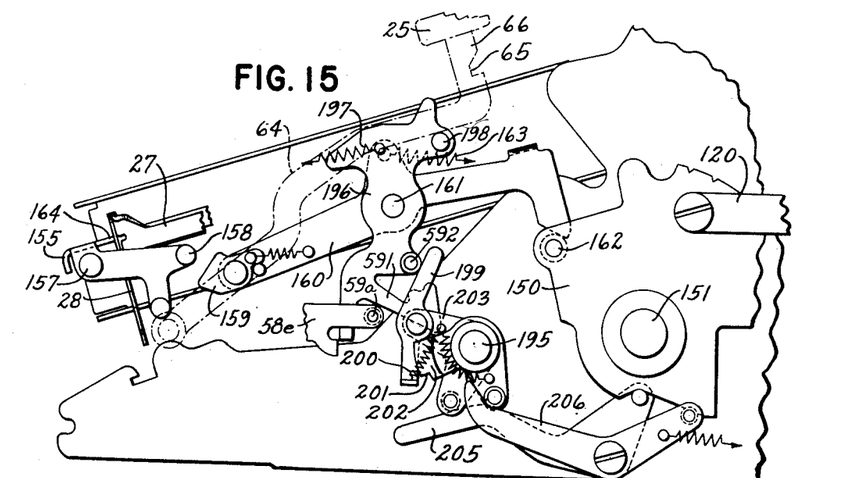
Fig. 15 is an elevation of the forward part of the right side of the machine with certain parts omitted so as to show a portion of the main operating means, the subtract control mechanism, and the key-release mechanism.

Referring to Figs. 15, 16 and 17, there is provided a key release bail 155 extending across the front end of the keyboard and pivoted in the left and right sides of the keyboard frame as shown by pivot 156 (Fig. 14) and pivot 157 (Fig. 15). The right end of this bail 155 has a rearwardly extending arm having a stud 158 in the path of pass-by pawl 159 on key release lever 160 pivoted on stud 161. The rear end of lever 160 has a surface held against stud 162 of plate 150 by spring 163. As plate 150 rocks counterclockwise during the first half of a machine cycle lever 160 is rocked clockwise by spring 163 and pawl 159 passes by stud 158 with no effect. During the last part of the second half of a machine cycle stud 162 makes contact with the rear end of lever 160, returning it to normal position and in so doing causing effective movement of pawl 159 against stud 158, rocking bail 155 clockwise as seen in Fig. 15 and then allowing the bail to return to normal as the pawl passes on. The rocking of bail 155 causes the forwardly extending fingers 164 thereof associated with each pair of shutters, comprising a latch plate and a zero stop plate, to spread said plates apart allowing the depressed keys to restore under the influence of their return springs 165. As represented by spring 166 (Fig. 17) each pair of shutters is spring urged to embrace the key stems of the associated row and in so moving return the key release bail to normal position by reason of the upward pressure exerted against the undersides of fingers 164. As will appear, this normal restoration of the numeral keys which is accompanied by return of the zero stop elements to normal prevents anomalous repeat operations of the machine.

Attention is called at this point to the fact that the latch plates 27 and zero stop plates 28 are each common to all the numeral keys of their respective bank of keys, that is, for any given bank of keys 21, the latch plate and zero stop plate of that bank will be actuated upon depression of any numeral key in that bank. Furthermore, similar latch plates and zero stops or equivalents, common to each bank of keys, are to be found as essential or standard parts of the setting up mechanisms of many key-set types of calculators now in general use. Likewise, a zero stop or stop plate or equivalent for the usual stop bar is found as a standard part of the mechanism of many key-operated types of calculators in general use. Advantage is taken of these facts in carrying out the present invention since, by so doing, the regular and standardized mechanisms in all such calculators in general use need not be changed nor complicated and expensive additional parts required to initiate an automatic cycle of operations.

In carrying out the present invention, use is preferably made of the movement of zero stop devices to initiate a cycle of operation upon actuation of any numeral key of a predetermined selected bank of keys to thereby, in the case of key-set calculators, eliminate the necessity of actuating the usual add motor bar or subtract motor bar, as the case may be, after all the required number keys have been set up for a given amount to be added or subtracted. Briefly, in the disclosed embodiment of the present invention, the actuation of any numeral key in a predetermined or selected bank of keys, through the movement of the zero stop plate of the selected bank, is employed to close, through an intermediate device, the usual electric motor circuit and cause a cycle of operation in the same manner as would the actuation of the standard add motor bar or subtract motor bar, depending upon its being an adding or subtracting calculation. In the form of the invention shown in Figs. 1 to 6 of the drawing, the arrangement is such that the cycle of operation may be initiated by actuation of a numeral key in either the units order bank of keys or by actuation of a numeral key in the hundreds order bank of keys, as may be selected by the operator.

Figure 4:
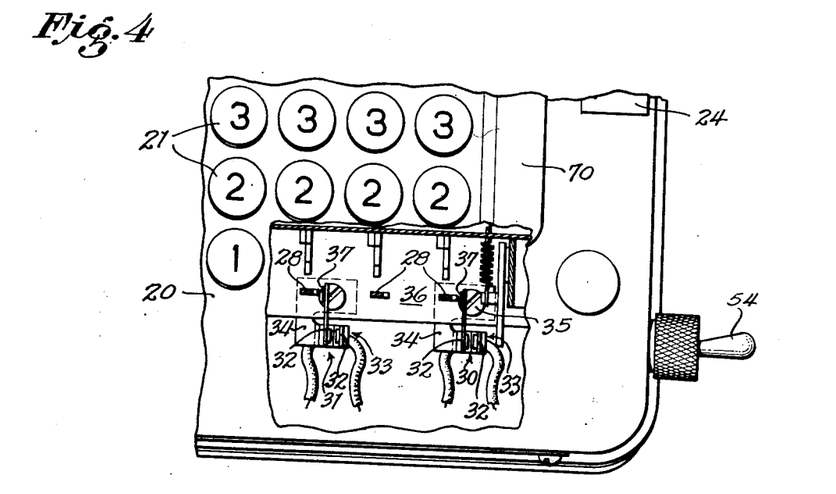
Fig. 4 is a top plan, portions being broken away to better illustrate details of the invention, said plan being of the lower right hand corner portion of the machine and corresponding to the line 4—4 of Fig. 2.
Figures 5, 6:
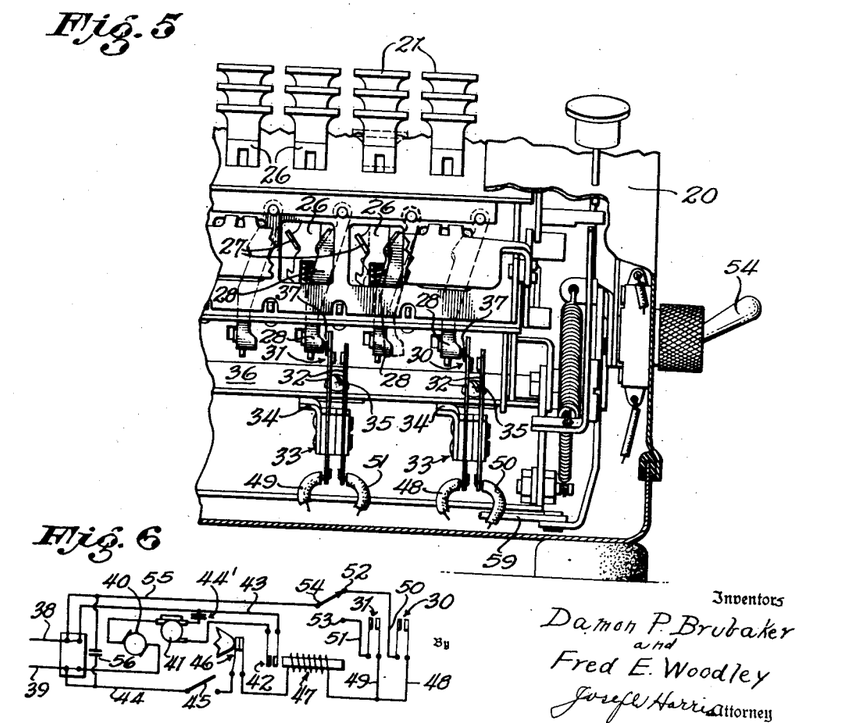
Fig. 5 is a front elevational view, enlarged, corresponding to the line 5—5 of Fig. 1, a portion of the casing being broken away to better illustrate details of construction.
Fig. 6 is a wiring diagram of the electrical circuits employed with the invention, as shown in Figs. 1 to 5.
Figure 7:
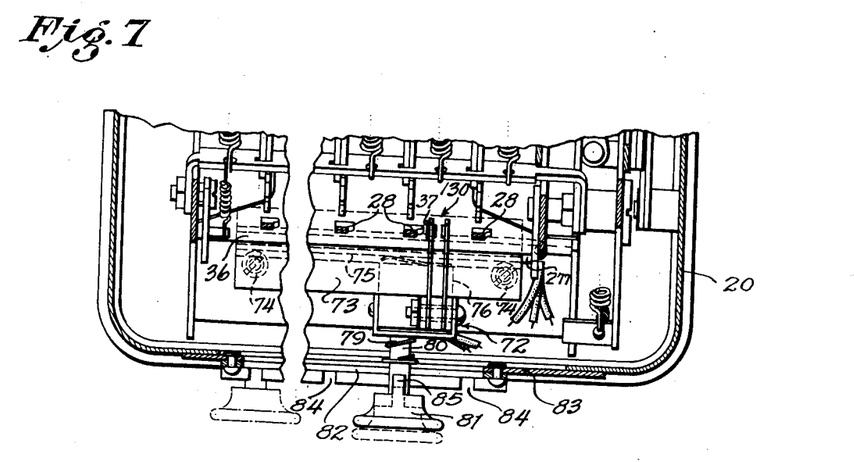
Fig. 7 is a part horizontal section, part top plan, portions being broken away, of the front portion of a calculating machine showing a modification of the invention.

As best shown in Figs. 4 and 5, two normally open contact switches 30 and 31 are positioned immediately adjacent the depending legs of the zero stop plates 28 of said units and hundreds banks of keys, respectively. Each of said contact switches, as shown, consists of two spring arms 32—32 having normally separated contact points at their outer ends, said arms being insulatingly mounted in a switch block 33, the latter being in turn preferably mounted on a plate 34 of insulating material, and the plate 34 is in turn attached by suitable means, such as screws 35, to an adjacent fixed transverse frame element 36 of the machine. Each of the spring arms 32, nearest its corresponding zero stop plate 28, is provided with an insulated bearing 37, to prevent shorting when contacted by the depending leg of the stop plate, as will be understood.

Referring now to the wiring diagram shown in Fig. 6, the normal wiring for the machine, which itself need not be changed, is as follows. Power is supplied through supply line wires 38—39. From line 39, the circuit goes to the usual motor 40, thence to governor 41, from the latter to normally open contact switch 42. From switch 42, the circuit is completed by wire 43 back to line wire 38, a condenser 44' being interposed between the governor 41 and wire 43 across the switch 42 as customary. Upon the closing of switch 42, the motor starts initiating a power cycle of machine operation.

In carrying out the present invention, supplemental electrical wiring is provided, as follows. A wire 44 is run from either line wire to a cut-out switch 45, thence preferably through a single cycle switch 46 to a solenoid 47 and from the latter run parallel leads 48 and 49, respectively, to one side of each of contact switches 30 and 31. From the opposite sides of said switches, run wires 50 and 51 to terminals 52 and 53 of a two point selector switch 54 and from the latter the circuit is completed back to the remaining line wire 38 by wire 55. To minimize arcing at switches 30 and 31, a condenser 56 is placed across the wires 44 and 55, as shown.

The selector switch 54 is preferably attached to the inside of the casing near the front right hand corner with the switch lever extended through the casing as shown. Similarly the cut out switch 45 may be attached to the inside of the casing near the rear right hand corner with the switch lever extended to the outside, as shown in Fig. 1.

Figure 3:
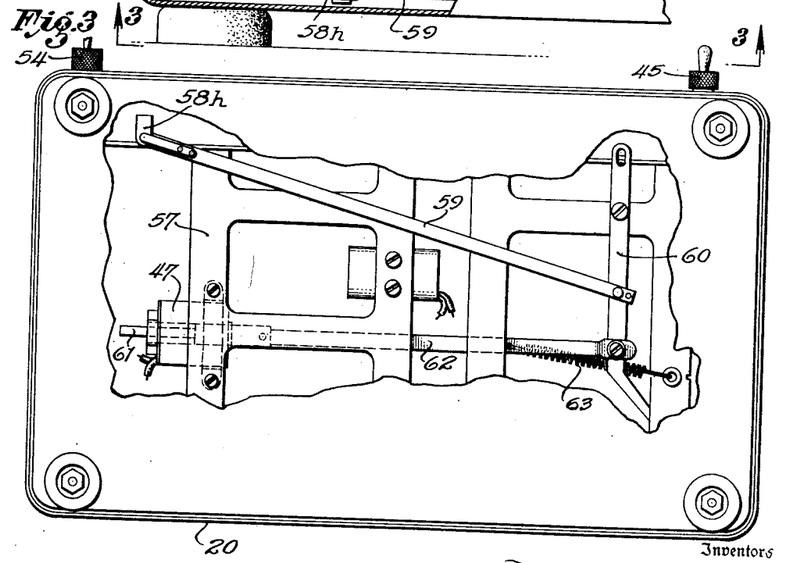
Fig. 3 is a bottom plan view of the machine, upon a smaller scale, corresponding to line 3—3 of Fig. 2, parts being broken away to illustrate more particularly the solenoid tripping arrangement.
Figure 13:
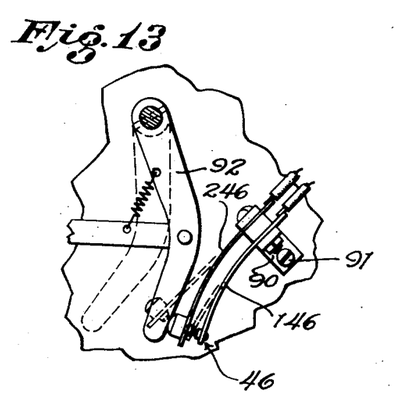
Fig. 13 is a detail view showing more particularly the single cycle switch arrangement and corresponds to line 13—13 of Fig. 1.

The single cycle switch 46, as best shown in Fig. 13, is preferably attached by a bracket 90 to a fixed part of the machine frame, as by screw 91 on the right hand side thereof, and adjacent a suitable moving element of the operating mechanism. As shown, said switch comprises two spring arms 146 and 246 with their contact points normally closed as shown by the full line positions in Fig. 13. The contact points are normally held closed, as shown, by the lever 92 which lever, after a cycle of operation is initiated, moves from the full line to the dotted line position shown, thus allowing the switch 46 to open, by the spring set of the blades, after the solenoid 47 has had opportunity to set the motor in operation as hereinafter described. Upon completion of the operating cycle, lever 92 is returned to its normal, full line position, thereby closing switch 46 ready for another cycle of operation. By employing the single cycle switch, any danger of a repeated cycle of machine operation, due to a delayed action in opening switch 31 or 32, by slow key restoration, is thus eliminated. The solenoid 47, as shown in Fig. 3, is preferably secured by strap or other suitable means to one of the rigid cross members 57 of the bottom frame of the machine.

In the standard method of operating the calculator without the present improvements, depression of the add motor bar or the subtract motor bar, after an amount has been set up on the numeral keys, initiates a machine cycle in which the amount set up is entered into the machine additively or subtractively according to the motor bar used. If the add motor bar 24 is the one used, it, through spring 57a (Fig. 2), rocks lever 58, pivoted at 57b on four-armed lever 58e, clockwise so a foot 58a thereon contacts stud 58b on lever 58c. Lever 58c, pivoted on four-armed lever 58e at 58d, rocks lever 58e clockwise, around supporting screw stud 58f, through engagement of an upwardly-extending bent arm of lever 58c engaging the forward edge of the upwardly-extending arm of lever 58e. An ear 58h (see also Fig. 3) on lever 58e is pivoted to link 59, and the rocking of lever 58e pulls link 59 forward which in turn pulls motor-contact trip lever 60 to close switch 42 and initiate and complete an operating cycle by the motor, governor and one revolution clutch in a well known manner, as more fully set forth above and in said prior Lambert patents. If the subtract motor bar 25 (Fig. 15) is fully operated it makes contact with stud 198 on subtract control plate 196, rocking it clockwise to condition the machine for subtraction as will be later explained and to initiate a machine operation. As plate 196 rocks fully clockwise an arm 59i thereof makes contact with a stud 59a on lever 58e, rocking it clockwise to initiate a machine cycle in the manner just described in connection with the operation of the add motor bar. With the present invention, a cycle of machine operation is initiated, upon closure of either switch 30 or 31. Upon energizing of the solenoid 47, the plunger 61 thereof is instantly retracted to the left as viewed in Fig. 3 and the link 62, pivotally connected to the plunger and to the trip lever 60, as shown, will obviously actuate said trip lever, thus initiating an operating cycle. The link 62 and connected solenoid plunger, after the tripping action, are returned to normal, after switch 46 opens, by retracting spring 63 suitably connected to the link 62 and a fixed part of the frame, as shown.

As will be understood, the present improvements may be rendered either operative or inoperative, as desired by the operator. If not to be used, the operator merely opens the cut out switch 45 and the machine is then used in the normal manner, that is, the add or subtract bar must be actuated after each amount has been set up on the keyboard.

To utilize the present improvements, the operator closes the cut out switch 45 and then adjusts the selector switch 54 to the desired terminal 52 or 53, depending upon whether he desires the automatic operation to take place upon actuation of a numeral key in the units order bank or hundreds order bank, as the improvements are shown, thus actuating the selected bank. For certain classes of work, as for instance adding a series of pay check or cash sale items, most of which will end in other than zero, the terminal for switch 30 of the lowest order of the key board will be used, thus eliminating the necessity of actuating the add bar correspondingly. For other classes of work, the other terminal for switch 31 will be used. In the event the amount set up on the machine does end in a "zero" in the bank selected for automatic initiation of an operating cycle, it would, of course, be necessary for the operator to actuate the add bar as in standard operation of the machine.

Referring to Fig. 14, each key row has associated therewith a stop bar 168, supported at the forward end by the element 36, urged forwardly, from the position shown, by spring 169. The rear end of each stop bar 168 is pivoted at 171 to the upper extending arm of an associated three-armed reducing lever 172 pivotally mounted on shaft 151. A bail 170 extends across all the reducing levers and is secured to arms, not shown, securely mounted on shaft 151. When shaft 151 is given its counter-clockwise rocking movement during the first half of a machine cycle, bail 170 moves forwardly and downwardly releasing reducing levers which allows the stop bars to move forward. Each stop bar, if a key in the associated row is operated, moves forward until it is stopped by the stem of a depressed key, such movement being proportional to the value of the key depressed. Therefore, reducing lever 172 moves counter-clockwise an angular distance proportional to the value of the key operated. The rearwardly extending arm of lever 172 is pivotally connected by link 174 to an associated printing bar 175 which is supported for vertical sliding movement in frame member 176, and which is equipped with type representing the numerals appearing on the keys. As a stop bar is moved during a machine cycle under numeral key control, the corresponding one of type 177 moves opposite a paper-supporting platen 178, there to be struck by type hammer 179 pivoted on shaft 180, as driven by spring 181, when released by latch 182 during the mid portion of the machine cycle. The type hammer latch release member 183, when type bar 175 is moved upwardly is allowed to rock counter-clockwise and, when shaft 112 rocks counter-clockwise the frame holding release member 183, and such members for all the other key rows, is moved forwardly to strike the latch pieces on a shoulder 184 thereof to cause a printing operation wherein all the selected digits are printed in a horizontal line.

Each reducing lever 172 has a companion two-armed lever 185 pivotally mounted on shaft 151 and adjacent thereto, the upwardly extending arm 186 having a rack adapted to engage the associated totalizer gear 178 in item-entering or total taking timing, such control mechanism being shown in the patents to which reference is made. A pin 190 for each row engages the slots of levers 172 and 185 of each row in adding operations to cause the rack of lever 185 to move a distance corresponding to the selected digit, if any has been selected in a row. If a subtracting operation is to be performed the pins 190 are all moved to the right to disconnect levers 172 and 185, and lever 185 is rocked by spring 191 which is attached to lever 192 secured to lever 193 holding pin 190. All levers 191 and 192 are pivoted on shaft 195. The result is lever 192 strikes stud 194 on stop bar 168 and lever 185 is moved a distance which is the nines complement of the selected number of the row, whereas at the same time the true value of the entered subtract item is set up on the type bars to be printed. The stud 194 in the units order is set to enter the tens complement of the selected units digit, as is well known in the art of subtracting by complements, and as is shown in more detail in the Lambert United States 2,428,084 patent mentioned. The shifting of shaft 195 to the right for subtract operations is accomplished by mechanism shown in Fig. 15 and the condition is set up by the clockwise rocking of the subtract control plate 196 normally held in the shown position for adding operations by spring 197 but rockable clockwise by downward pressure on stud 198 by downward movement of subtract motor bar 25. As plate 196 rocks clockwise pawl 199 mounted on bell crank lever 203 loose on shaft 195, rocks counter-clockwise under the influence of spring 200 to engage shoulder 201 of bell crank lever 202, secured to shaft 195. As a machine cycle commences bell crank lever 205 is rocked clockwise by plate 150 and in turn rocks shaft 195 in the same direction shifting it to the right, by mechanism shown in the last referred to Lambert Patent 2,428,084, to condition the machine for subtraction. The lever 206 returns bell crank 202 to normal adding position near the end of the machine cycle during which it was moved to subtract position.

Figure 1:
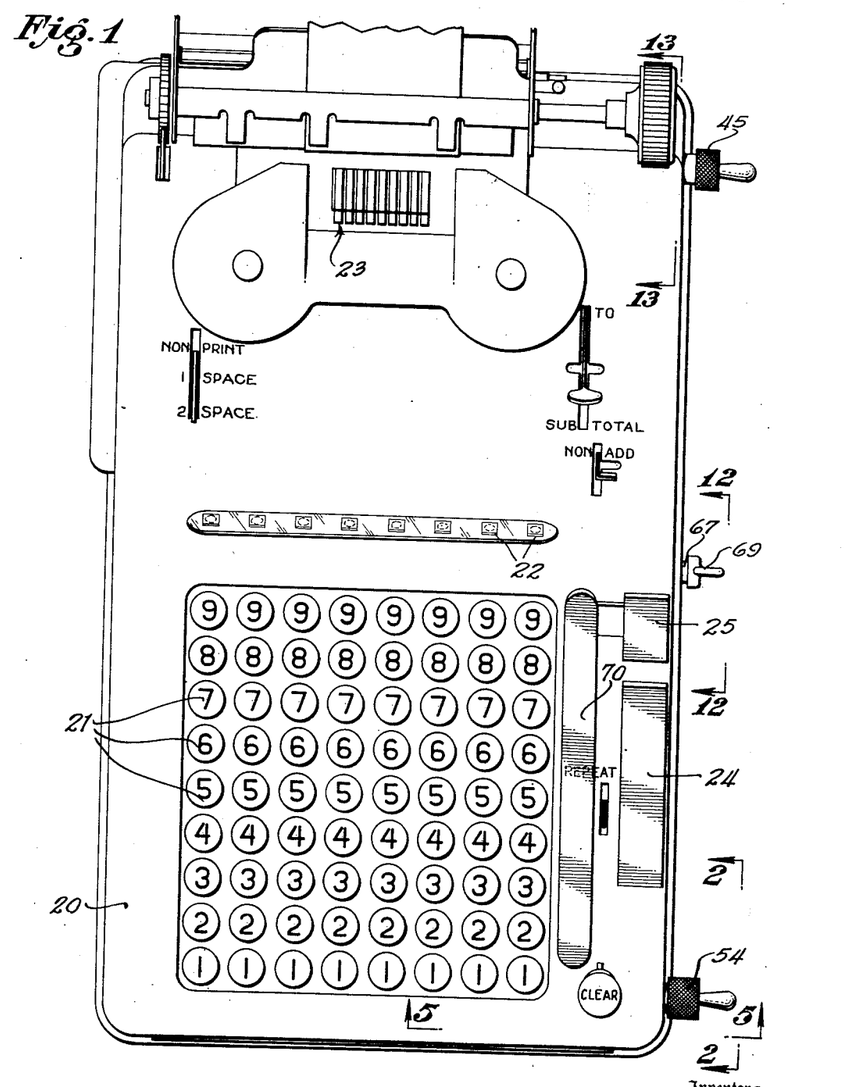
Fig. 1 is a top plan view of a calculating machine showing one embodiment of the invention applied thereto.
Figure 2:
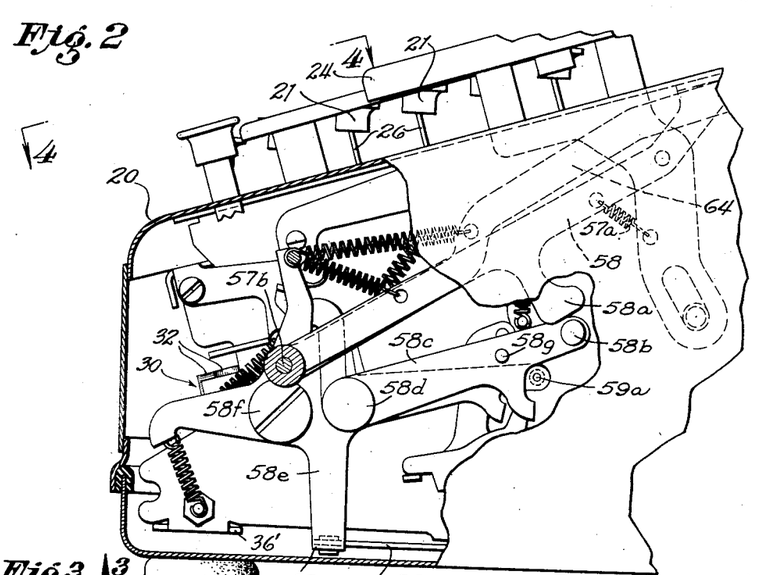
Fig. 2 is a side, partial elevational view, upon an enlarged scale, corresponding to line 2—2 of Fig. 1 but with parts broken away to better disclose certain features of the mechanism.
Figure 12:
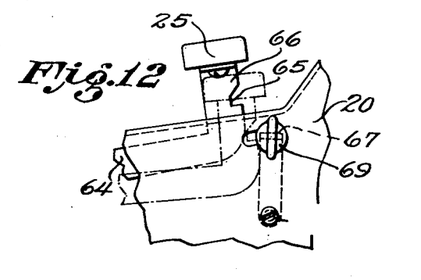
Fig. 12 is a side elevational view showing more particularly the means for latching the subtract motor bar in partially-operated position when the improvements are employed in a series of subtract entries.

To employ the improvements for a series of subtract items, the following means are utilized, reference being had to Figs. 1, 2, and 12. Advance partial depression of the subtract motor bar conditions the machine to subtract and complete depression of it causes the initiation of a machine cycle in which the selected amount is entered subtractively. Advantage is taken of this advance or prior setting-up movement of the subtracting devices in carrying out the present invention when a series of subtract operations are to be made. This is accomplished by temporarily latching or retaining the subtract bar in a partially depressed position, that is, in such position that the advance setting-up of the subtracting devices has been made by rocking plate 196 (Fig. 15) but before that last portion of the depression of the subtract bar has been made which actuates link 59 (Fig. 2) and trips the motor-contact-trip-lever 60. As the subtract bar lever 64 (Fig. 15) is rocked partially down, to condition the machine for subtraction but without initiating a machine cycle, the lower edge of said lever strikes stud 198 on subtract plate 196 rocking it slightly clockwise to an intermediate position where stud 592 thereon, which normally holds pawl 199 disengaged, is no longer effective and said pawl engages shoulder 201 of bell crank lever 203 so that on the ensuing machine cycle, when it is initiated by digit key operation, the shaft 195 is shifted to subtract position. This partial movement of subtract plate 196 brings rearwardly extending arm 591 nearer to a stud 59a on machine trip lever 58e (see also Fig. 2) but does not rock trip lever 58e. Thus the machine is conditioned for subtraction by partial depression of and latching in partially depressed condition of the subtract bar 25.

Any suitable means may be employed for the purpose just described. A simple and inexpensive arrangement, as shown best in Fig. 12, consists in providing a notch 65 in the depending stem 66 of the subtract bar and providing a cooperable latch 67 pivoted to the inside of the casing at 68, said latch having an operating handle 69 extended to the exterior of the casing through a suitable slot therein. As will be evident, when it is desired to subtract a series of items, using the automatic cycle-initiating action upon depression of a numeral key in the selected bank, the operator latches the subtract bar in the partially depressed position hereinbefore described so that the energizing of the solenoid 47 will actuate the trip lever 60 as in the case of an add operation but the resulting registration will be a subtract operation because of the already set-up subtracting devices.

To facilitate a single or an occasional subtractive operation when the calculating machine is employing the automatic tripping means primarily for adding operations, an extension 70 may be attached to the usual or standard subtract bar 25, said extension being located alongside the units order bank of the machine so that the operator may depress it simultaneously with depression of a numeral key in said units order bank or hundreds order bank, as the case may be, dependent upon the position of the selector switch as will be understood.

It will also be apparent that, if the machine is adjusted for a series of subtract operations and there is a zero in the activated order of an intended entry, the add motor bar may be used to effectuate a machine operation.

From the preceding description, it will be seen that the present invention is of extreme simplicity, consisting of few, inexpensive parts easily incorporated in machines of original manufacture or applied as an attachment or accessory to machines already in use, all without requiring any fundamental changes in the standard construction or arrangement of the various usual mechanisms of the calculating machine. As will be further apparent, while the embodiment of the invention so far described in detail provides for selective automatic initiation of an operating cycle in the case of two banks of the machine, nevertheless, additional contact switches corresponding to contact switches 30 and 31 could readily be incorporated for still other banks of the machine and substituting a corresponding multiple point selector switch for the two-point selector switch shown.

However, to provide for a completely selective automatic operation by actuation of any numeral key in any bank of the machine, a modified construction such as shown in Figs. 7 to 10 may be employed. In said modified construction, a single contact switch 130 corresponding to switch 30 is employed, said switch 130 being carried by an insulated block 72, which is horizontally slidable across the front end of the machine inside the casing, on a track preferably in the form of an elongated block of insulating material 73 which block is secured by screws 74 to the fixed frame member 36'. Said block is preferably provided with three longitudinally extending grooves 75 with which cooperate three corresponding projections 76 from the block 72. Within the grooves 75 are provided longitudinally extending bar contact elements 77, 177, and 277 with which cooperate three corresponding leaf spring contacts 78, 178, and 278, respectively, affixed to the inner ends of said three projections 76. The block 72 with its contact switch 130, in addition to being slidable longitudinally of track block 73, is also adjustable outwardly of the track block 73, being normally held in innermost, contact condition by spring 79 on stem 80 of a hand knob 81 extended outwardly of the casing through an elongated slot 82 provided in a cover plate 83.

Figure 9:
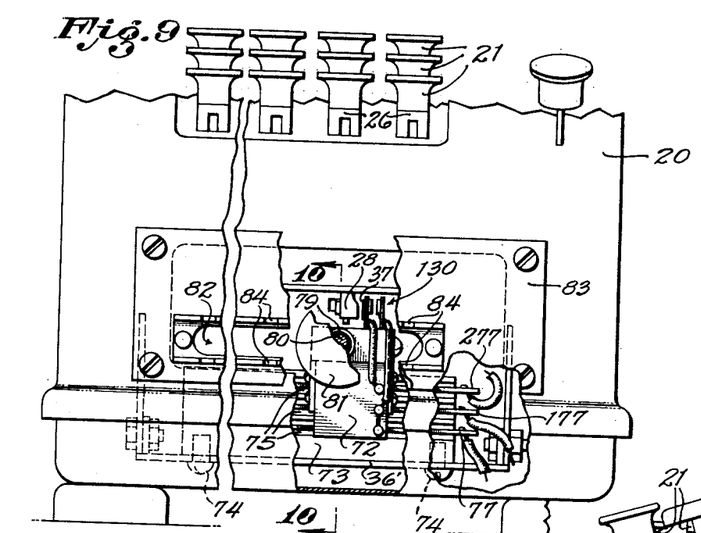
Fig. 9 is a front elevation of the modified form of Fig. 7, portions being broken away to illustrate details of construction.
Figure 10:
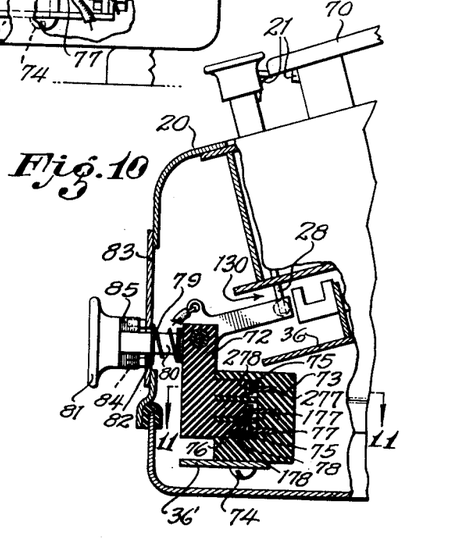
Fig. 10 is a vertical section corresponding to section line 10—10 of Fig. 9.
Figure 11:
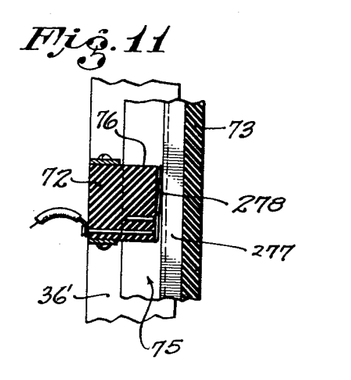
Fig. 11 is a horizontal detail section corresponding to section line 11—11 of Fig. 10.

As will be understood, the contact switch 130, when the parts are in the position shown in Figs. 9 and 10, is adapted to occupy the same relation to any one of the zero stop levers or stop shutters 28 of the machine as do either of switches 30 and 31 of the first described form. To insure that the switch 130 be accurately positioned relative to the zero stop lever of whichever bank of the key board is selected, the cover plate 83 is provided with a series of notches 84, one for each bank of the key board, with which cooperate short flanges 85 on the knob 81. With the construction described, it will be obvious that, by pulling out the knob 81 and thereby the block 72 and switch 130, the latter will clear the zero stop levers as it is moved to the desired bank of the key board and then released and accurately positioned by the notches 84 and knob flanges 85.

Figure 8:
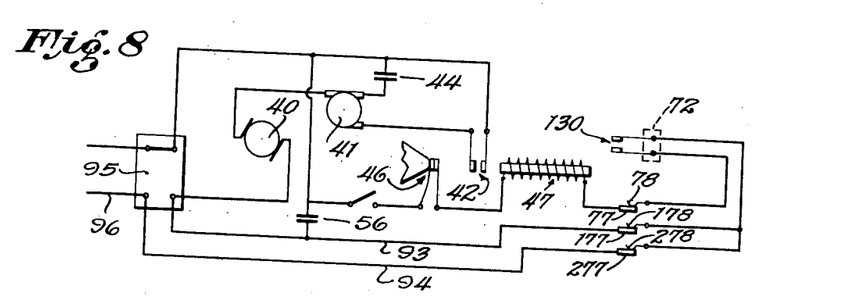
Fig. 8 is a wiring diagram of the circuits used in connection with the Fig. 7 modification.

The electrical wiring is substantially the same for the modified form, as shown in Fig. 8, as for the first described form except that no selector switch is required. However, to insure against any accidental manual initiation of an operating cycle during a shift of the switch 130 from one position to another, and which manual action might jam a rack bar against the switch block, two lines 93 and 94 are run from the main panel or block 95 with a break or gap between main supply line 96 and line 93 as shown in Fig. 8, thus insuring that the standard motor circuit will be open or broken while contact switch 130 is being shifted.

In the universally selective form of the invention just described, it will be seen that few changes or additional parts are required in the regular or standard construction and operation of the several component mechanisms of the calculating machine and, further, that the universal selective form may be incorporated in the calculating machine either as original equipment or added, at nominal expense, as an accessory or attachment to machines already in use.

Although there has herein been shown and described what is now considered the preferred embodiment of the invention, it is obvious that various changes as to details and types of construction, location and operation of parts may be made without departing from the spirit of the invention. All changes, variations and modifications are contemplated that come within the scope of the appended claims.

What is claimed is:

1. In a machine of the class described having denominational order rows of digit value keys selectively operable to set up a value to be entered into the machine, main operating means for giving the machine cycles of operation in which the set-up amounts are entered into the machine and in which the operated keys are restored to the unoperated condition as an incident to the completion of a machine cycle, an electric motor for driving the main operating means, an electric circuit for operating the electric motor, said circuit containing a normally open switch, and switch-closing means which when operated closes said normally open switch and conditions the main operating means to be operated for a cycle of operation by the motor, the combination of an electric machine-starting means which when energized closes the normally open switch to start the motor and cause a cycle of machine operation; an electric circuit for energizing said starting means, said circuit containing two or more normally open key row switches arranged in parallel in the circuit; means in each key row for closing the associated key row switch when a key in the row is operated; and switch means for rendering one or the other of said key row switches effective or ineffective to complete the starting means circuit.

2. The machine of claim 1 in which a normally closed control switch is provided in the machine-starting means electric circuit, said switch being opened by the main operating means immediately after the commencement of a machine cycle and closed upon completion of a machine cycle.

3. The machine of claim 1 in which resilient key restoring and key locking means is provided, in which the keys normally are held in operated condition by said locking means against the action of the resilient restoring means and in which the main operating means key restoring action merely renders the key locking means ineffective so that a key otherwise may be held in operated condition to cause the machine automatically to make repeated entry cycles in which the value of the operated key is entered into the machine.

4. In a key-set calculating machine having a plurality of banks of numeral keys; value selection means cooperable with said keys and including an element for each bank, and each of said elements being common to all the keys of its associated bank and movable by operation of any key thereof; power operating means; an add motor bar and a subtract motor bar, complete manual actuation of either of said bars being adapted to initiate a corresponding operating cycle of the machine by initiation of operation of said power means; means, automatically operable upon actuation of any key of a selected predetermined bank through movement of its movable element, for initiating an operating cycle of the power means in which the selected amount normally is added; and means, separate from said automatically operable means, including devices for retaining the subtract bar in partially actuated condition, to selectively change the automatic operating cycle from addition to subtraction.

5. In a key-set calculating machine having a power-driven main operating means which, when operation thereof is initiated, gives the machine a cycle of operation, the combination with a plurality of banks of numeral keys, the keys of each bank being selectively operable to determine an amount to be registered; and a means for each bank common to the keys thereof and moved when an associated key is operated; of means including electric switch elements selectively shiftable to be operatively associated with the keys of any one selected bank and automatically operated upon actuation of any key of the selected bank by movement of the means common to the keys of that bank, for initiating a power-driven cycle of the machine.

6. In a machine of the class described having denominational rows of digit value keys selectively operable to set up a value to be entered into the machine; digit key restoring means; and a cyclically-operable main operating means for giving the machine cycles of operation whereby an amount set up on the digit keys may be entered during the ensuing machine cycle, and the digit key restoring means being operated by the main operating means during said ensuing machine cycle to restore the operated digit keys to the unoperated condition by the end of the cycle, the combination of cycle-initiating means operable to initiate a machine cycle; an electrical means which when energized operates the cycle-initiating means; a key-operated means associated with each of two or more of the digit key rows and each of said means being actuated when a key of the associated row is operated; and a normally open electric circuit which when closed energizes the electrical means, said circuit having a selectively movable switch by which the circuit may be cooperatively associated with any one of the key-operated means to be closed by such associated key-operated means when a key of the associated row is operated.

7. In a power-operated, key-set calculating machine having an electric motor for driving the machine, the combination of an electrically operable means for initiating a machine cycle of operation; a plurality of banks of numeral keys, each key settable to determine an amount to be registered; and key-operated means including a multiple point electric selective control switch, which switch may be adjusted for association with the keys of any selected one of the banks, and which switch is automatically operated upon actuation of any key in the bank with which it is associated for operating the electrically operable machine cycle initiating means.

DAMON P. BRUBAKER.
FRED E. WOODLEY.

References Cited in the file of this patent

UNITED STATES PATENTS

| Number | Name | Date |
| --- | --- | --- |
| 1,136,725 | Shiek | Apr. 20, 1915 |
| 1,808,213 | Eichenauer | June 2, 1931 |
| 1,849,169 | Britten, Jr. | Mar. 15, 1932 |
| 1,853,050 | Horton | Apr. 12, 1932 |
| 1,877,802 | Britten, Jr. | Sept. 20, 1932 |
| 2,117,620 | Mathi | May 17, 1938 |
| 2,121,683 | Britten, Jr. | June 21, 1938 |
| 2,311,354 | Friden et al. | Feb. 16, 1943 |
| 2,396,188 | Mehan et al. | Mar. 5, 1946 |
| 2,552,789 | Hopkins | May 15, 1951 |